UNITED STATES PATENT OFFICE.

CHARLES DE LA HARPE AND RUDOLF BURCKHARDT, OF BASEL, SWITZERLAND, ASSIGNORS TO THE FIRM OF DYE WORKS FORMERLY L. DURAND, HUGUENIN & CO., OF BASEL, SWITZERLAND.

GALLOCYANIN DYE AND PROCESS OF MAKING SAME.

No. 898,842.      Specification of Letters Patent.      Patented Sept. 15, 1908.

Application filed May 28, 1908. Serial No. 435,509.

*To all whom it may concern:*

Be it known that we, CHARLES DE LA HARPE and RUDOLF BURCKHARDT, both chemists, citizens of the Swiss Republic, and residents of Basel, Switzerland, have invented a new and useful Gallocyanin Dyestuff and a Process of Making Same, of which the following is a full, clear, and exact specification.

We have found that a gallocyanin derived from gallamid may be condensed with ammonia, if the condensation be effected in the presence of an aromatic nitrohydrocarbon, as for instance dinitrobenzene. The condensation product thus obtained dissolves in concentrated sulfuric acid to a red-brown solution. It constitutes a dark-brown powder nearly insoluble in water and scarcely soluble in alcohol with a green-blue coloration. For its technical employ it is advantageously transformed into a leucoderivative whose hydrochlorate is easily soluble in water and gives on chromium mordanted fibers vivid, pure, green-blue tints.

Example. In an autoclave are introduced 60 liters of alcohol, 30 kilograms of a gallocyanin derived from gallamid, (for instance, of the product resulting from the condensation of nitrosodiethylanilin with gallamid) and 5 kilograms dinitrobenzene and to the mixture thus obtained are added, while stirring, 100 liters of an alcoholic solution of ammonia containing 15 kilograms ammonia. The autoclave is then closed and the reaction mass heated, while stirring, to 110–130° C. until a sample of the reaction mass dissolves in sulfuric acid with a brown coloration. The excess of ammonia and a part of the alcohol are then distilled off, and the reaction product is let cool down, filtered, washed with alcohol and dried. It dissolves in concentrated sulfuric acid with a brown-red coloration, which does not change on addition of water. It is insoluble in water and alkalies, scarcely soluble in alcohol and almost insoluble in benzene. For its employ as a dyestuff, it is converted into a leucoderivative by its treatment in a known manner with a reducing agent. The leucoderivative thus obtained is in the form of its hydrochlorate easily soluble in water and gives on chromium mordanted fibers vivid, pure green-blue tints. It dissolves in concentrated sulfuric acid to a red-brown solution.

What we claim is:

1. The described process for the manufacture of a new gallocyanin-dyestuff which consists in heating a gallocyanin derived from gallamid with ammonia in presence of an aromatic nitrohydrocarbon.

2. The described process for the manufacture of a new gallocyanin-dyestuff, which consists in heating a gallocyanin derived from gallamid with ammonia in presence of an aromatic nitrohydrocarbon and in treating the condensation product thus obtained with a reducing agent.

3. The described process for the manufacture of a new gallocyanin-dyestuff which consists in heating a gallocyanin derived from gallamid with ammonia in presence of dinitrobenzene.

4. The described process for the manufacture of a new gallocyanin-dyestuff which consists in heating a gallocyanin derived from gallamid with ammonia in presence of dinitrobenzene and in treating the condensation product thus obtained with a reducing agent.

5. As a new product, the described gallocyanin dyestuff derived from ammonia and a gallocyanin derived from gallamid, the said dyestuff giving on chromium mordanted fibers vivid, pure, green-blue tints and dissolving in concentrated sulfuric acid with a red-brown coloration.

6. As a new article of manufacture the described gallocyanin dyestuff constituted by the hydrochlorate of the leucoderivative of the condensation product of ammonia with a gallocyanin derived from gallamid, the said dyestuff being easily soluble in water, dissolving in concentrated sulfuric acid to a red-brown solution and giving on chromium mordanted fibers vivid, pure, green-blue tints.

In witness whereof we have hereunto signed our names this 18th day of May 1908, in the presence of two subscribing witnesses.

CHARLES DE LA HARPE.
RUDOLF BURCKHARDT.

Witnesses:
  GEO. GIFFORD,
  AMAND RITTER.